United States Patent [19]

Easterly, Jr. et al.

[11] Patent Number: 4,676,913

[45] Date of Patent: Jun. 30, 1987

[54] COAL LIQUOR CLARIFICATION WITH WATER-SOLUBLE, HIGH MOLECULAR WEIGHT POLYMERS HAVING LOW CONCENTRATION OF CATIONIC MOIETIES

[75] Inventors: James P. Easterly, Jr., Bay City; William C. Foshee; Jack C. Lamphere, both of Midland, all of Mich.

[73] Assignee: The Dow Chemical Company, Midland, Mich.

[21] Appl. No.: 826,939

[22] Filed: Feb. 6, 1986

Related U.S. Application Data

[63] Continuation-in-part of Ser. No. 738,619, May 29, 1985, abandoned, which is a continuation-in-part of Ser. No. 332,078, Dec. 18, 1981, abandoned.

[51] Int. Cl.$^4$ ................................................ C02F 1/56
[52] U.S. Cl. .................................... 210/734; 210/738; 209/5
[58] Field of Search ..................... 210/734, 738; 209/5

[56] References Cited

U.S. PATENT DOCUMENTS

| | | | |
|---|---|---|---|
| 3,408,293 | 10/1968 | Dajani et al. | 210/734 |
| 3,859,212 | 1/1975 | Smalley et al. | 210/728 |
| 4,024,328 | 5/1977 | Zweigle | 210/734 |
| 4,077,930 | 3/1978 | Lim et al. | 210/734 |
| 4,104,226 | 8/1978 | Melzer et al. | 524/516 |
| 4,141,827 | 2/1979 | Coscia et al. | 210/734 |
| 4,396,513 | 8/1983 | Haldeman | 210/734 |

FOREIGN PATENT DOCUMENTS 52-71391  6/1977  Japan .................... 210/734

*Primary Examiner*—Benoit Castel

[57] ABSTRACT

Coal liquors are clarified by contacting them with high molecular weight copolymers of from about 70 to about 99 mole percent of a nonionic water-soluble monomer such as acrylamide and from 1 to 30 mole percent of a cationic monomer such as methacryloylethyl trimethyl ammonium chloride or methacrylamidopropyl trimethyl ammonium chloride.

8 Claims, No Drawings

COAL LIQUOR CLARIFICATION WITH WATER-SOLUBLE, HIGH MOLECULAR WEIGHT POLYMERS HAVING LOW CONCENTRATION OF CATIONIC MOIETIES

CROSS-REFERENCE TO RELATED APPLICATIONS

This application is a continuation-in-part of application Ser. No. 738,619, filed May 29, 1985, which is a continuation-in-part of application Ser. No. 332,078, filed Dec. 18, 1981, both now abandoned.

BACKGROUND OF THE INVENTION

The present invention relates to methods for clarifying coal liquors or slurries by employing water-soluble polymers.

Clarification of coal liquors or slurries is an important aspect in the economy of operating a coal production plant. Generally, such plants are operated on a closed system basis in that the water used to wash the raw coal is recycled for reuse. Since such water serves primarily to remove coal fines and clays mixed with the raw coal thereby forming coal liquors, it is critical that the water be relatively clear and contain only minor amount of suspended solids when it is reused in the washing procedure. Otherwise, undesirably large volumes of water would be necessary to process the coal. Since the coal fines and clay which are removed from these coal liquors are often used as filler materials and in other applications which require inexpensive inert mateials, it is essential that such coal liquor clarification be very inexpensive.

Previously, the coal industry has employed various anionic and cationic water soluble polymers to remove both coal particles and colliodal clay particles. For example, as taught in U.S. Pat. No. 3,408,293, it is a common practice to prefloc the coal liquor or coal slurry with anionic polymers in order to coagulate the coal particles and subsequently treat the prefloc slurry with cationic polymer in order to flocculate the coal particles. Unfortunately, as indicated in this patent, very careful control over the quantities of anionic and cationic polymers employed must be exercised in order to obtain efficient clarification of the coal liquor. Also, significant quantities of the various polymers need to be employed in order to achieve such desirable coal liquor clarification.

Alternatively, U.S. Pat. No. 4,141,827 teaches the use of a low molecular weight polyacrylamide which has been chemically modified to provide quaternized dimethylaminomethyl groups on the amide groups for settling suspended solids in coal washing waste water. The specified acrylamide polymer is prepared by aminoalkylating the amide moiety with a dialkylamine and formaldehyde and subsequently quaternizing their reaction product. The polymer for use in the process has a molecular weight of about 7,000 to 110,000 and at least about 50 mole percent of the acrylamide mer units are, quaternized. Due to the fact that the pendant amide groups will cross-link the polymer via methylenebis moieties in the presence of formaldehyde, it is necessary to maintain a relatively high conversion level in the Mannich reaction, i.e., the amide functionality must be maintained as low as possible. Preferably, at least 60 to 90 mole percent of the acrylamide groups have been quaternized. In the examples, formaldehyde and dimethylamine are employed in a stoichiometric excess in relation to the polymer to quaternize the maximum amounts of acrylamide groups.

In view of the foregoing deficiencies of the prior art processes for clarifying coal liquors, it remains highly desirable to provide a method for coal liquor clarification which does not exhibit the deficiencies of the prior art processes.

SUMMARY OF THE INVENTION

Accordingly, the present invention is such an improved method for coal liquor clarification. Specifically, the present invention comprises contacting an aqueous suspension of coal particles with a clarifying amount of a water-soluble copolymer of the general structural formula:

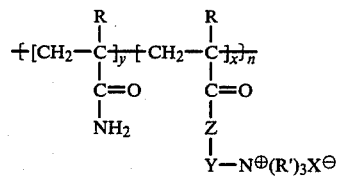

wherein Z is O or NH, R is H or $CH_3$, Y is $C_2H_4$ or $C_3H_6$, R' is a hydrocarbon, $X^-$ is an anion, x is a mole fraction of from about 1 to about 30 and y is a mole fraction of from about 70 to about 99 and n is an integer such that the polymer has a weight average molecular weight of at least 1 million. Surprisingly, the high molecular weight acrylamide polymers having a relatively low cationic content used in the method of the present invention more efficiently clarify coal liquors than the prior art processes employing a polymer having a relatively high cationic polymer. In addition, for effective performance, it is unnecessary, in the practice of the present invention, to employ the high molecular weight acrylamide polymer having low cationic content in combination with a second polymer or to pre-treat the coal liquor with an anionic polymer.

The practice of the present invention is found to successfully clarify any of a wide variety of coal liquors containing coal particles and colloidal-size clay.

DETAILED DESCRIPTION OF THE INVENTION

For the purposes of this invention, the term "coal liquor" is meant to include any aqueous suspension of coal particles including particles of hard coal such as anthracite as well as soft coal such as lignite and the like. Such suspensions advantageously contain from about 0.25 to about 50, preferably from about 2 to about 30, most preferably from about 2 to about 10, weight percent of total solids. Such liquors contain coal particles wherein the proportion of clay to coal may vary from about 95:5 to about 5:95, usually from about 80:20 to about 20:80 on a weight bases.articles and othersuspended particles common to coal liquors.

The cationic polymers suitably employed in the practice of the present invention are water-soluble copolymers having the general structural formula as represented by structural formula (I) hereinbefore, wherein Z is O or NH, R is H or $CH_3$, Y is $C_2H_4$ or $C_3H_6$, each R' is a hydrocarbon, $X^-$ is an anion, x is a mole fraction of the polymerized cationic monomer and is from about 1 to about 30 and y is the mole fraction of the polymerized non-ionic monomer and is from about 70 to about 99 and n is an integer such that the polymer has a weight average molecular weight of at least 1 million. The anion represented by $X^-$ can be a halo such as chloro or bromo, a sulfonate, acetate or nitrate. In general, the preferred $X^-$ is chloro. Preferably, each R' is the same or different alkyl, aryl or aralkyl group. More preferably, each R' is individually an alkyl group having from 1 to 6, more preferably from 1 to 4 carbon atoms.

Representative examples of non-ionic monomers are acrylamide and methacrylamide and representative examples of cationic monomers are acryloylethyl and acryloylpropyl trialkyl ammonium compounds such as acryloylethyl trimethyl ammonium halide, particularly acryloylethyl trimethyl ammonium chloride; methacryloylethyl and methacryloylpropyl trialkyl ammonium compounds such as methacryloylethyl trimethyl ammonium halide, particularly methacryloylethyl trimethyl ammonium chloride; and acrylamido-and methacrylamidoethyl or propyl trialkyl ammonium salts such as acrylamidopropyl trimethyl ammonium halide and methacrylamidopropyl trimethyl ammonium halide, particularly, acrylamidopropyl trimethyl ammonium chloride and methacrylamidopropyl trimethyl ammonium chloride.

Preferably, x is a number such that the polymer comprises from about 2 to 20, more preferably from about 5 to about 15, most preferably from about 5 to 12, mole percent of the cationic monomer; y is a number such that the polymer comprises from about 80 to 98, more preferably from about 85 to about 95, most preferably from about 88 to 95, mole percent of the non-ionic monomer and n is a number which has a value such that the polymer has a weight average molecular weight of from about 1 to 25 million, more preferably from about 2 to about 20 million.

In addition to the aforementioned non-ionic and cationic monomers, the cationic copolymers useful in the practice of the present invention can also contain up to 15 mole percent, preferably less than 5 mole percent, of anionic comonomer such as acrylic acid, methacrylic acid or an acrylamidoalkyl sulfonic acid or a methacrylamido sulfonic acid.

In practice, the coal liquor is contacted with the described high molecular weight, cationic copolymer in an amount sufficient to remove the suspended coal particles from the aqueous phase. In a preferred embodiment wherein the coal liquor also contains suspended clay particles, the copolymer is added in amounts sufficient to remove both suspended coal particles and clay particles from the aqueous phase. The amounts of the copolymer most advantageously employed will vary depending upon a variety of factors including the specific coal liquor being clarified and the specific polymer employed in its clarification. In general, the cationic copolymers will be employed in amounts ranging from about 0.2 to about 100 weight parts per million (ppm) parts, by weight of the coal liquor. More preferably, the copolymer is employed in an amount form about 0.5 to about 25 ppm, most preferably from about 1 to 10 ppm based on the weight of the coal liquor.

The method of adding the cationic copolymer to the coal slurry is not particularly critical as long as a uniform dispersion of the copolymer in the coal slurry is obtained. Advantageously, however, the cationic copolymer is dissolved in an aqueous solution in concentrations from about 0.2 to about 1.5 weight percent, most preferably from about 0.3 to about 0.6 weight percent prior to addition to the coal liquor. It is understood that the cationic copolymer may be added to the coal liquor as a water-in-oil emulsion, e.g., as described in U.S. Pat. No. RE 28,474, which contains sufficient water-soluble surfactant to cause inversion when combined with the coal slurry. Alternatively, the emulsion may be inverted to form an aqueous solution and then added to the coal liquor.

Although not required, it is sometimes advantageous to pretreat the coal liquor with an anionic, water-soluble copolymer prior to contacting the liquor with the cationic copolymer. Alternatively, the anionic copolymer can be added to the coal liquor after the cationic copolymer is added. In either instance, the anionic copolymer is usually dissolved in an aqueous medium to form an aqueous solution of the copolymer having from about 0.25 to about 0.5 weight percent of the anionic copolymer and then added to the coal liquor. Typically, the anionic copolymer is added in an amount sufficient to cause preliminary flocculation of the coal particles. Such quantities are preferably in the range of from about 0.3 to about 10 weight parts of the anionic copolymer per million weight parts of the coal liquor, most preferably from about 0.5 to about 2 ppm. As an additional advantage of the practice of this invention, it is found that significantly less of the anionic polymer; is used in the pre-treatment than is if some other cationic polymer is employed. In fact, in many instances, the treatment with anionic copolymer is not required.

In the practice of this invention, it is found that the coal liquors can be clarified to a level such that the transmittance of light through the liquor is often in excess of 75 percent and, under preferred conditions, in excess of 85 percent. In addition, it is also found that settling rates and the degree of compaction are significantly improved by practicing the present invention as compared to prior art procedures utilizing conventional cationic polymers having low molecular weight, e.g., a weight average molecular weight of less than 50,000 and relatively high concentration of cationic monomer, e.g., greater than 60 mole percent.

The following examples are given for the purposes of illustration and should not be construed as limiting its scope. Unless otherwise indicated, all parts and percentages are by weight.

GENERAL PROCEDURE FOR CLARIFICATION OF COAL LIQUOR

Coal-clay suspensions obtained from various coal preparation plants are dewatered and dried in an oven operated at 150° F. The dried tailings are dispersed in tap water to 5 percent solids by mixing 3 liters of water with the desired amount of coal tailings for 3 minutes at high speed on a commercial Waring Blendor to form a coal liquor. Each of the polymer flocculants tested is diluted to a concentration of 0.25 percent (active polymer weight) and allowed to equilibrate. The resulting solutions are then diluted to a concentration of 0.025 percent immediately before use.

A 250 milliliter (ml) portion of the mixed coal liquor is poured into a 250 ml volumetric cylinder. An amount of 0.025 percent flocculant solution as indicated in Table I is added to the liquor and then the cylinder is stoppered. The cylinder is rotated end-over-end 4 consecutive times, set in front of a light source and unstoppered.

The average floc size, the time for the solid liquid interface to settle to various levels and clarity of the supernatant liquid at the end of 3 minutes is determined and recorded in Table I. Clarity of the supernatant liquid is determined using a Hach Chemical Company Spectrophotometer. Clarity is defined in terms of percent of light transmittance using light having a wave length of 450 nanometers.

Relative performance of the various polymer flocculants is calculated according to the following equation: relative performance equals the performance of the test polymer wherein Polymer performance is equal to 7.8 times (clarity of the supernatant in percent transmittance at 3 minutes times (the square root of 1 plus the settling rate of the solids in inches per minutes)) divided by (the concentration of the active polymer flocculant in parts per million based on the weight of the coal liquor times the square root of the square root of the height (inches) of the compacted column after 3 minutes).

in accordance with the teachings of U.S. Pat. No. RE 28,474 is tested for flocculating capability for coal liquors. An aqueous solution of 0.3 weight percent of the copolymer in 4 percent NaCl exhibits a viscosity at 25° C. of 15 cps. The results of these tests are recorded in Table I.

Following the same procedure, several cationic polymers of the prior art are similarly tested for flocculating capability and the results of these tests are also recorded in Table 1.

TABLE I

| Sample No. | Coal Liquor (1) Type | pH | Cationic Flocculant (2) Type | Dosage, ppm | % Light Transmittance (3) | Settling Rate (4) in./min. | Compaction (5) in. | Relative Performance (6) |
|---|---|---|---|---|---|---|---|---|
| 1 | BEH | 6.9 | AAM/METAC | 2.5 | 95 | 16 | 1.8 | 1.00 |
| $C_1$* | BEH | 6.9 | PAPA | 2.5 | 46 | 2 | 7.5 | 0.14 |
| $C_2$* | BEH | 6.9 | PVBTMAC | 2.5 | 56 | 2 | 3.8 | 0.20 |
| 2 | PAT | 7.5 | AAM/METAC | 1.5 | 75 | 40 | 0.6 | 1.16 |
| 3 | PAT | 7.5 | AAM/METAC | 2.0 | 86 | 40 | 0.6 | 1.00 |
| $C_3$* | PAT | 7.5 | PAPA | 2.0 | 26 | 4 | 1.1 | 0.09 |
| $C_4$* | PAT | 7.5 | PVBTMAC | 2.0 | 24 | 4 | 1.1 | 0.08 |
| 4 | ALB | 8 | AAM/METAC | 5.5 | 81 | 11 | 3.0 | 1.00 |
| $C_5$* | ALB | 8 | PVBTMAC | 6.0 | 10 | 0.5 | 11.3 | 0.03 |

*Not an example of the invention.
(1) Coal liquor having pH as indicated. The letter symbols indicate the type of coal liquor wherein:
BEH - coal liquor containing 21 percent coal and 79 percent ash wherein the ash is 78 percent silica/22 percent clay wherein the clay is 64 percent illite/36 percent mixture of kaolinite and chlorite.
PAT - coal liquor containing 39 percent coal and 61 percent ash wherein the ash is 60 percent silica/40 percent clay wherein the clay is 32 percent illite/68 percent kaolinite
ALB - coal liquor containing 15 percent coal and 85 percent ash wherein the ash is 64 percent silica/36 percent clay wherein the clay is 50 percent illite/19 percent mixture of kaolinite and chlorite/31 percent montmorillonite.
(2) Cationic polymer flocculant used in parts per million parts of coal liquor wherein
AAM/METAC is the acrylamide/methacryloylethyl trimethyl ammonium chloride (92.5/7.5) having a Mw of ~5 million.
PAPA is a polyethylene polyamine having a Mw of ~80,000.
PVBTMAC is polyvinylbenzyl trimethyl ammonium chloride having a Mw of ~80,000.
(3)–(6) are as defined in the aforementioned General Procedure.

EXAMPLE 1

Following the foregoing procedure, a copolymer of 92.5 mole percent of acrylamide and 7.5 mole percent of methacryloylethyl trimethyl ammonium chloride having a weight average molecular weight of about 5 million and prepared in the form of a water-in-oil emulsion As evidenced by the data shown in Table 1, the cationic acrylamide copolymer of Sample Nos. 1–4 is a superior flocculant to commercial cationic coal liquor flocculants such as polyalklyene polyamines and polyvinylbenzyl trimethyl ammonium chloride polymers.

EXAMPLE 2

Following the general procedure mentioned hereinbefore, the cationic acrylamide copolymer of Example 1 are also used in combination with anionic preflocculants and anionic postflocculants. The results of these tests are also reported in Table II.

TABLE II

| Sample No. | Coal Liquor (1) Type | pH | Prefloc (7) Type | Dosage ppm | Cationic Flocculant (2) Type | Dosage ppm | Postfloc (8) Type | Dosage ppm | % Light Transmittance (3) | Settling Rate (4) in./min. | Compaction (5) in. | Relative Performance (6) |
|---|---|---|---|---|---|---|---|---|---|---|---|---|
| 5 | BEH | 7 | — | — | AAM/METAC | 2 | — | — | 62 | 9.4 | 2.5 | 1.00 |
| 6 | BEH | 7 | AAM/AA(a) | 0.5 | AAM/METAC | 1.5 | — | — | 71 | 9.0 | 2.6 | 1.11 |
| $C_6$* | BEH | 7 | AAM/AA(a) | 0.5 | PVBTMAC | 1.5 | — | — | 47 | 2.8 | 5.3 | 0.38 |
| 7 | PEV | 7.2 | — | — | AAM/METAC | 2.5 | — | — | 83 | 12.6 | 2.1 | 1.00 |
| 8 | PEV | 7.2 | AAM/AA(a) | 1 | AAM/METAC | 1.5 | — | — | 87 | 13.2 | 2.1 | 1.07 |
| $C_7$* | PEV | 7.2 | AAM/AA(a) | 1 | PVBTMAC | 1.5 | — | — | 70 | 6.3 | 2.1 | 0.62 |
| 9 | PAT | 7.5 | — | — | AAM/METAC | 1.5 | — | — | 75 | 40 | 0.6 | 1.16 |
| 10 | PAT | 7.5 | — | — | AAM/METAC | 1.5 | AAM/AA(b) | 0.5 | 89 | 35 | 0.5 | 1.00 |
| $C_8$* | PAT | 7.5 | — | — | PVBTMAC | 2.0 | — | — | 24 | 4 | 1.1 | 0.08 |
| $C_9$* | PAT | 7.5 | — | — | PVBTMAC | 2.0 | AAM/AA(b) | 0.5 | 58 | 17 | 0.6 | 0.35 |
| $C_{10}$* | PAT | 7.5 | — | — | PAPA | 2.0 | — | — | 26 | 4 | 1.1 | 0.09 |
| $C_{11}$* | PAT | 7.5 | — | — | PAPA | 2.5 | AAM/AA(b) | 0.5 | 61 | 17 | 0.6 | 0.37 |

*Not an example of the invention.
(1) Same as (1) in Table I except that
PEV - coal liquor containing 82 percent coal and 18 percent ash wherein the ash is 57 percent silica/43 percent clay wherein the clay is 37 percent illite/63 percent kaolinite and chlorite.
(2)–(6) Same as (2)–(6) in Table I.
(7) Preflocculant in parts per million parts of coal liquor is added to the liquor prior to addition of the cationic flocculant. AAM/AA(a) is a copolymer of 75 weight percent acrylamide and 25 weight percent acrylic acid having a Mw of ~10 million.
(8) Postflocculant in parts per million parts of coal liquor is added to the liquor subsequent to addition of the cationic flocculant. AAM/AA(b) is a copolymer of ≧96 weight percent acrylamide and ≦4 weight percent acrylic acid having a Mw of ~9 million.

As evidenced by the data shown in Table ll, the cationic copolymer of the present invention is a superior flocculant to conventional anionic copolymers whether employed alone or in combination with an anionic pre-flocculant or post flocculant. In fact, as shown by Table ll, the cationic copolymer of the present invention performs almost as well in the absence of an anionic copolymer as in its presence.

COMPARATIVE EXAMPLE

A low molecular weight polymer containing fifty mole percent aminomethylated acrylamide groups quaternized with dimethylsulfate and fifty mole percent acrylamide is prepared using the methods of U.S. Pat. No. 4,141,827. Specifically, acrylamide is polymerized in aqueous solution according to the methods of Example one of U.S. Pat. No. 4,141,827. The low resulting low molecular weight polymer is then reacted, according to the method of that example, with sufficient amounts of formaldehyde and dimethylamine to convert about 50 mole percent of the acrylamide mers (the mole ratio of formaldehyde and dimethylamine to the number of moles of polymerized acrylamide being 0.5:0.525:1). Following this reaction, an equivalent amount of dimethylsulfate based on the dimethylamine is added to the resulting polymer. The pH of the resulting aqueous solution of quaternized acrylamide polymer is about 6. The resulting polymer is not stable and is found to gel within 2 days after preparation. This instability of the low molecular weight polymer makes it unusable for commercial application.

What is claimed is:

1. A method for clarifying coal liquor which comprises contacting an aqueous coal suspension containing from about 0.25 to about 50 weight percent of total solids comprising coal particles and colloidal-size clay particles in a weight ratio of coal to clay in the range from about 95:5 to 5:95 with a clarifying amount in the range from about 0.2 to about 100 weight parts per million (ppm) parts, by weight of the coal liquor, of a water-soluble copolymer of the general structural formula:

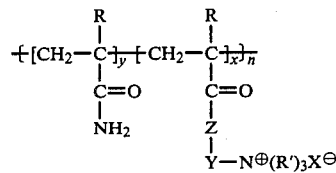

wherein Z is O or NH, R is H or $CH_3$, Y is $C_2H_4$ or $C_3H_6$, R' is a hydrocarbon, $X^-$ is an anion, x is a mole fraction of polymerized cationic monomer from about 1 to about 30 and y is a mole fraction of polymerized non-ionic monomer from about 70 to about 99 and n is an integer such that the polymer has a weight average molecular weight of at least 1 million, whereby said clarifying amount is sufficient to increase the transmittance of light through the liquor, the settling rate and the degree of compaction.

2. The method of claim 1 wherein the aqueous suspension contains from about 2 to about 30 weight percent of total solids.

3. The method of claim 2 wherein the weight ratio of coal to clay is in the range from about 80:20 to about 20:80.

4. The method of claim 1 wherein the non-ionic comonomer is acrylamide or methacrylamide and the cationic monomer is an acryloylethyl trialkyl ammonium compound, an acryloylpropyl trialkyl ammonium compound, a methacryloylethyl trialkyl ammonium compound, a methacryloylpropyl trialkyl ammonium compound, an acrylamidoethyl trialkyl ammonium salt, an acrylamidopropyl trialkyl ammonium salt, a methacrylamidoethyl trialkyl ammonium salt or a methacrylamidopropyl trialkyl ammonium salt.

5. The method of claim 4 wherein the cationic comonomer is acrylamidopropyl trimethyl ammonium halide, methacrylamidopropyl trimethyl ammonium halide, acryloylethyl trimethyl ammonium halide or methacryloylethyl trimethyl ammonium halide.

6. The method of claim 4 wherein x is a number such that the copolymer comprises from about 2 to 20 mole percent of the cationic monomer and y is a number such that the copolymer comprises from about 80 to 98 mole percent of the non-ionic monomer.

7. The method of claim 6 wherein x is a number such that the copolymer comprises from about 5 to 15 mole percent of the cationic monomer and y is a number such that the copolymer comprises from about 85 to 95 mole percent of the non-ionic monomer and n is a number which has a value such that the polymer has a weight average molecular weight of from about 1 to 25 million.

8. The method of claim 4 wherein the amount of the copolymer is from about 0.5 to about 25 weight parts per million (ppm) parts, by weight of coal liquor.

* * * * *